United States Patent
Kawase et al.

(10) Patent No.: US 7,208,544 B2
(45) Date of Patent: Apr. 24, 2007

(54) FLOW-AND-LEVELING AGENTS FOR WATERBORNE COATINGS

(75) Inventors: Masafumi Kawase, Koshigaya (JP); Takashi Horiguchi, Sugito-machi (JP); Shigehiro Kawahito, Soka (JP)

(73) Assignee: Kusumoto Chemicals, Ltd., Chiyoda-Ku, Tokyo (JP)

( * ) Notice: Subject to any disclaimer, the term of this patent is extended or adjusted under 35 U.S.C. 154(b) by 459 days.

(21) Appl. No.: 10/713,102

(22) Filed: Nov. 17, 2003

(65) Prior Publication Data

US 2004/0097652 A1 May 20, 2004

Related U.S. Application Data

(63) Continuation of application No. 10/151,825, filed on May 22, 2002, now abandoned.

(30) Foreign Application Priority Data

Jun. 14, 2001 (JP) .............................. 2001-179999

(51) Int. Cl.
*C08F 30/08* (2006.01)
(52) U.S. Cl. ........................ 524/521; 525/100; 526/279
(58) Field of Classification Search ................ 525/100; 526/279; 524/521
See application file for complete search history.

(56) References Cited

U.S. PATENT DOCUMENTS

| | | | | |
|---|---|---|---|---|
| 5,541,261 A | * | 7/1996 | Fock et al. ................... | 525/299 |
| 5,998,501 A | * | 12/1999 | Tsutsumi et al. ........... | 523/160 |
| 6,074,698 A | * | 6/2000 | Sakurai et al. .............. | 427/307 |
| 6,165,457 A | * | 12/2000 | Midha et al. ............ | 424/78.17 |
| 6,306,994 B1 | * | 10/2001 | Donald et al. ........... | 526/317.1 |
| 6,458,878 B1 | * | 10/2002 | Tsuboi et al. ............... | 524/432 |
| 6,630,522 B2 | * | 10/2003 | Kawase et al. ............. | 523/161 |
| 6,642,335 B2 | * | 11/2003 | Kawase et al. ............. | 526/279 |

* cited by examiner

*Primary Examiner*—Margaret G. Moore
(74) *Attorney, Agent, or Firm*—Hahn & Voight PLLC

(57) ABSTRACT

Provided is a flow-and-leveling agent for waterborne coatings which provides the coated surface with a flow-and-leveling property by blending into waterborne coatings taking a serious view of finishing and which improves coating defects such as ruptures and craters to contribute to a rise in the appearance of the coating film. The above flow-and-leveling agent is an acryl base copolymer containing a trimethylsilyl group in a proportion of 2 to 64% by weight and has a number average molecular weight of 500 to 30000.

7 Claims, No Drawings

FLOW-AND-LEVELING AGENTS FOR WATERBORNE COATINGS

CROSS REFERENCE TO RELATED APPLICATION

This application is a continuation of application Ser. No. 10/151,825, filed May 22, 2002 now abandoned, which claims foreign priority to JP 2001-179999, filed Jun. 14, 2001.

TECHNICAL FIELD TO WHICH THE INVENTION BELONGS

The present invention relates to novel acryl silicone base flow-and-leveling agents for waterborne coatings which can provide the coating surfaces with a flow-and-leveling property by adding them to waterborne coatings in small amounts.

PRIOR ART

In recent years, it has been tried to use waterborne coatings in place of solventborne coatings from the viewpoints of resource savings and measures for environmental pollution. For example, it is investigated to use waterborne coatings for primer coatings, base coatings and top coatings for automobiles. This allows flow-and-leveling agents for waterborne coatings having higher functions to be required. In order to meet this requirement, acryl base polymers, modified silicone oils and the like have so far been used as flow-and-leveling agents.

The Problems to be Solved by the Invention

However, a satisfactory flow-and-leveling property and an improvement in coating defects are not necessarily achieved with these conventional techniques in the fields requiring a high appearance such as uses for automobiles which have been researched in recent years, and if large amounts of flow-and-leveling agents are added in order to obtain a good appearance, adverse effects are exerted on a layer-to-layer adhesive property in recoating or adverse effects such as roughening the surfaces of the recoated films and separating of the flow-and-leveling agents in coatings are often observed.

Accordingly, an object of the present invention is to provide flow-and-leveling agents capable of being utilized for uses requiring a high appearance which has not been obtained with conventional flow-and-leveling agents for waterborne coatings.

Means for Solving the Problems

Various investigations repeated by the present inventors have resulted in finding that flow-and-leveling agents of (1), (2), (3) and (4) described below make it possible to provide the coating films of the waterborne coatings with such a good flow-and-leveling property as has so far never been obtained and that adverse effects are not exerted on the recoating property.

(1) A flow-and-leveling agent for a water base coating comprising a trimethylsilyl group-containing copolymer obtained by copolymerizing a reactive monomer (A) having a trimethylsilyl group represented by a structural formula:

—Si(CH$_3$)$_3$ in a molecular structure and/or a reactive monomer (B) having a trimethylsilyl group in the form of a tris(trimethylsiloxy)silyl group represented by a structural formula:

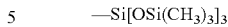
—Si[OSi(CH$_3$)$_3$]$_3$ in a molecular structure with a (meth)acrylic acid ester (C) represented by a formula:

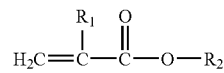

[wherein $R_1$ represents a hydrogen atom or methyl, and $R_2$ represents an alkyl group having 1 to 12 carbon atoms] and/or a (meth)acrylic acid ester (D) represented by a formula:

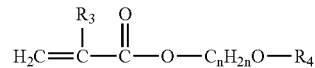

[wherein $R_3$ represents a hydrogen atom or methyl; $R_4$ represents an alkyl group having 1 to 18 carbon atoms; and n represents an integer of 2, 3 or 4] and acrylamide (E) represented by a formula:

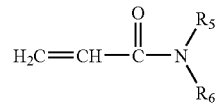

[wherein $R_5$ and $R_6$ each represent a hydrogen atom or an alkyl group having 1 to 8 carbon atoms] and/or a (meth)acrylic acid ester (F) represented by a formula:

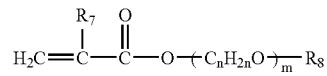

[wherein $R_7$ represents a hydrogen atom or methyl; $R_8$ represents a hydrogen atom or an alkyl group having 1 to 18 carbon atoms; m represents an integer of 2 to 100, and n represents an integer of 2, 3 or 4; and —(C$_n$H$_{2n}$O)$_m$— means that 2 to 100 units of only one kind of a glycol unit out of three kinds of the glycol units in which n is 2, 3 and 4 are present and that total 2 to 100 units of two or three kinds of the glycol units out of three kinds of the above glycol units are present] and/or a (meth)acrylic acid (G) represented by a formula:

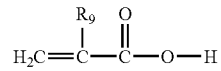

[wherein $R_9$ represents a hydrogen atom or methyl], wherein the above trimethylsilyl group-containing copolymer contains a trimethylsilyl group originating in the monomer (A) and/or the monomer (B) in a proportion of 2 to 64% by weight, preferably 5 to 40% by weight; it contains a copolymerization unit originating in the (meth)acrylic acid ester (C) and/or the (meth)acrylic acid ester (D) in a proportion of 2% by weight or more, preferably 5% by weight or more; it contains a copolymerization unit originating in the acrylamide (E) and/or the (meth)acrylic acid ester (F) and/or the (meth)acrylic acid (G) in a proportion of 5% by weight or more, preferably 10% by weight or more; and it has a number average molecular weight of 500 to 30000, preferably 1000 to 10000.

(2) A flow-and-leveling agent for a water base coating comprising a trimethylsilyl group-containing copolymer obtained by reacting a copolymer of a multifunctional monomer into which a trimethylsilyl group or a tris(trimethylsiloxy)silyl group can be introduced, the (meth)acrylic acid ester (C) and/or the (meth)acrylic acid ester (D) described in the above item (1) and the acrylamide (E) and/or the (meth)acrylic acid ester (F) and/or the (meth)acrylic acid (G) described in the above item (1) with a trimethylsilyl group-containing compound and/or a tris(trimethylsiloxy)silyl group-containing compound, wherein the above trimethylsilyl group-containing copolymer contains a trimethylsilyl group in a proportion of 2 to 64% by weight, preferably 5 to 40% by weight; it contains a copolymerization unit originating in the (meth)acrylic acid ester (C) and/or the (meth)acrylic acid ester (D) in a proportion of 2% by weight or more, preferably 5% by weight or more; it contains a copolymerization unit originating in the acrylamide (E) and/or the (meth)acrylic acid ester (F) and/or the (meth)acrylic acid (G) in a proportion of 5% by weight or more, preferably 10% by weight or more; and it has a number average molecular weight of 500 to 30000, preferably 1000 to 10000.

(3) A flow-and-leveling agent for a water base coating comprising a trimethylsilyl group-containing copolymer obtained by copolymerizing the monomer (A) and/or the monomer (B) described in the above item (1), the (meth)acrylic acid ester (C) and/or the (meth)acrylic acid ester (D) described in the above item (1), the acrylamide (E) and/or the (meth)acrylic acid ester (F) and/or the (meth)acrylic acid (G) described in the above item (1) with a reactive monomer (H) capable of being copolymerized with them, wherein the above copolymer contains a trimethylsilyl group originating in the monomer (A) and/or the monomer (B) in a proportion of 2 to 64% by weight, preferably 5 to 40% by weight; it contains a copolymerization unit originating in the (meth)acrylic acid ester (C) and/or the (meth)acrylic acid ester (D) in a proportion of 2% by weight or more, preferably 5% by weight or more; it contains a copolymerization unit originating in the acrylamide (E) and/or the (meth)acrylic acid ester (F) and/or the (meth)acrylic acid (G) in a proportion of 5% by weight or more, preferably 10% by weight or more; it contains a copolymerization unit originating in the monomer (H) in a proportion of not exceeding 50% by weight; and it has a number average molecular weight of 500 to 30000, preferably 1000 to 10000.

(4) A flow-and-leveling agent for a water base coating comprising a trimethylsilyl group-containing copolymer obtained by reacting a copolymer of the multifunctional monomer described in the above item (2), the (meth)acrylic acid ester (C) and/or the (meth)acrylic acid ester (D) described in the above item (1), the acrylamide (E) and/or the (meth)acrylic acid ester (F) and/or the (meth)acrylic acid (G) described in the above item (1) and a reactive monomer (H) capable of being copolymerized with them with a trimethylsilyl group-containing compound and/or a tris(trimethylsiloxy)silyl group-containing compound, wherein the above trimethylsilyl group-containing copolymer contains a trimethylsilyl group in a proportion of 2 to 64% by weight, preferably 5 to 40% by weight; it contains a copolymerization unit originating in the (meth)acrylic acid ester (C) and/or the (meth)acrylic acid ester (D) in a proportion of 2% by weight or more, preferably 5% by weight or more; it contains a copolymerization unit originating in the acrylamide (E) and/or the (meth)acrylic acid ester (F) and/or the (meth)acrylic acid (G) in a proportion of 5% by weight or more, preferably 10% by weight or more; it contains a copolymerization unit originating in the monomer (H) in a proportion of not exceeding 50% by weight; and it has a number average molecular weight of 500 to 30000, preferably 1000 to 10000.

In the copolymer in which a trimethylsilyl group originating in the monomer (A) and/or the monomer (B) has a content of smaller than 2% by weight, a satisfactory effect as the flow-and-leveling agent for a water base coating is not observed. On the other hand, if it is more than 64% by weight, a phenomenon close to rough surface which is observed in silicone base flow-and-leveling agents is more likely to appear.

The (meth)acrylic acid ester (C) and/or the (meth)acrylic acid ester (D) are copolymerized in order to provide an effect of obtaining a good flow-and-leveling property, and the satisfactory flow-and-leveling property can not be obtained with monomers other than them. When both of (C) and (D) are used, a proportion of the amounts thereof is optional, and they are preferably used so that a trimethylsilyl group is contained in the trimethylsilyl group-containing copolymer in a proportion of 2 to 64% by weight, preferably 5 to 40% by weight; the copolymerization unit originating in (E) and/or (F) and/or (G) accounts for 5% by weight or more, preferably 10% by weight or more altogether; and the copolymerization unit originating in both of (C) and (D) accounts for 2% by weight or more, preferably 5% by weight or more altogether.

The acrylamide (E) and/or the (meth)acrylic acid ester (F) (specifically, polyalkylene glycol ester) and/or the (meth)acrylic acid (G) are copolymerized in order to provide the acryl silicone polymer with hydrophilicity to make it possible to disperse the polymer homogeneously in the water base coating. When each of (E), (F) and (G) is used, a proportion of the amounts thereof is optional, and they are preferably used so that a trimethylsilyl group is contained in the trimethylsilyl group-containing copolymer in a proportion of 2 to 64% by weight, preferably 5 to 40% by weight; the copolymerization unit originating in (C) and/or (D) accounts for 2% by weight or more, preferably 5% by weight or more altogether; and the copolymerization unit originating in each (E), (F) and (G) accounts for 5% by weight or more, preferably 10% by weight or more altogether.

The multifunctional monomer into which a trimethylsilyl group or a tris(trimethylsiloxy)silyl group can be introduced is copolymerized in advance with (C) and/or (D) and (E) and/or (F) and/or (G), a trimethylsilyl group-containing compound and/or a tris(trimethylsiloxy)silyl group-containing compound can be introduced into the resulting copolymer by addition reaction or condensation reaction. Also in this case, an effect of providing the coated surface with a good flow-and-leveling property is observed if a trimethylsilyl group is contained in the trimethylsilyl group-containing copolymer in a proportion of 2 to 64% by weight, preferably 5 to 40% by weight; the copolymerization unit originating in (C) and/or (D) is contained in a proportion of 2% by weight or more, preferably 5% by weight or more; and the copolymerization unit originating in each (E), (F) and (G) is contained in a proportion of 5% by weight or more, preferably 10% by weight or more.

An effect of providing the coated surface with a good flow-and-leveling property is observed as well in the acryl silicone copolymer containing a copolymerization unit originating in the other reactive monomer (H) in a proportion falling in a range of not exceeding 50% by weight based on the copolymer if a trimethylsilyl group is contained in the synthesized copolymer in a proportion of 2 to 64% by weight, preferably 5 to 40% by weight; the copolymerization unit originating in (C) and/or (D) is contained in a proportion of 2% by weight or more, preferably 5% by weight or more; and the copolymerization unit originating in (E) and/or (F) and/or (G) is contained in a proportion of 5% by weight or more, preferably 10% by weight or more.

Even if the copolymerization unit originating in the other reactive monomer (H) is contained in a proportion falling in a range of not exceeding 50% by weight based on the copolymer, an effect of providing the coated surface with a good flow-and-leveling property is observed as well in the acryl silicone copolymer obtained by introducing a trimethylsilyl group-containing compound and/or a tris(trimethylsiloxy)silyl group-containing compound into the copolymer of the multifunctional monomer into which a trimethylsilyl group or a tris(trimethylsiloxy)silyl group can be introduced, (C) and/or (D), (E) and/or (F) and/or (G) and the reactive monomer (H) copolymerizable with them by addition reaction or condensation reaction, if a trimethylsilyl group is contained in a proportion of 2 to 64% by weight, preferably 5 to 40% by weight; the copolymerization unit originating in (C) and/or (D) is contained in a proportion of 2% by weight or more, preferably 5% by weight or more; and the copolymerization unit originating in (E) and/or (F) and/or (G) is contained in a proportion of 5% by weight or more, preferably 10% by weight or more.

If the copolymer has a number average molecular weight of smaller than 500, the above copolymer blended into the coating does not provide a sufficiently high ability to spread on a coated surface in coating, so that the satisfactory flow-and-leveling property can not be obtained. On the other hand, if the copolymer has a number average molecular weight of larger than 30000, the copolymer can not evenly be dispersed in the water base coating and is more likely to cause coating defects such as cissing.

The examples of the reactive monomer (A) having a trimethylsilyl group and the reactive monomer (B) having a trimethylsilyl group in the form of a tris(trimethylsiloxy) silyl group include 3-methacryloxypropyltrimethylsilane, 3-methacryloxypropyltris(trimethylsiloxy)silane and vinyltris(trimethylsiloxy)silane.

The examples of the trimethylsilyl group-containing compound and the tris(trimethylsiloxy)silyl group-containing compound include trimethylchlorosilane, hexamethyldisilazane, tris(trimethylsiloxy)hydrosilane, 3-aminopropyltris (trimethylsiloxy)silane and 3-mercaptopropyltris(trimethylsiloxy)silane.

The (meth)acrylic acid ester (C) includes, for example, methyl (meth)acrylate, ethyl (meth)acrylate, normal propyl (meth)acrylate, isopropyl (meth)acrylate, normal butyl (meth)acrylate, isobutyl (meth)acrylate, tertiary butyl (meth) acrylate, normal octyl (meth)acrylate, 2-ethylhexyl (meth) acrylate, isononyl (meth)acrylate and lauryl (meth)acrylate.

The (meth)acrylic acid ester (D) includes, for example, 2-methoxyethyl (meth)acrylate, 2-ethoxyethyl (meth)acrylate, 2-butoxyethyl (meth) acrylate, 2-octoxyethyl (meth) acrylate, 2-lauroxyethyl (meth)acrylate, 2-stearoxyethyl (meth)acrylate, 3-methoxybutyl (meth)acrylate and 4-methoxybutyl (meth)acrylate.

The acrylamide (E) includes, for example, acrylamide, N-methylacrylamide, N-ethylacrylamide, N-isopropylacrylamide, N-normal butylacrylamide, N-tertiary butylacrylamide, N-2-ethylhexylacrylamide, N,N-dimethylacrylamide, N,N-diethylacrylamide and diacetoneacrylamide.

The (meth)acrylic acid ester (F) includes, for example, ethylcarbitol (meth)acrylate, methoxypolyethylene glycol (meth)acrylate [the number (m) of the ethylene glycol units is 2 to 100], methoxypolypropylene glycol (meth)acrylate [the number (m) of the propylene glycol units is 2 to 100], methoxypoly(ethylene-propylene) glycol (meth)acrylate [the total number (m) of the number of the ethylene glycol units and the number of the propylene glycol units is 2 to 100], methoxypoly(ethylene-tetramethylene) glycol (meth) acrylate [the total number (m) of the number of the ethylene glycol units and the number of the tetramethylene glycol units is 2 to 100], butoxypoly(ethylene-propylene) glycol (meth)acrylate [the total number (m) of the number of the ethylene glycol units and the number of the propylene glycol units is 2 to 100], octoxypoly(ethylene-propylene) glycol (meth)acrylate [the total number (m) of the number of the ethylene glycol units and the number of the propylene glycol units is 2 to 100], lauroxypolyethylene glycol (meth)acrylate [the number (m) of the ethylene glycol units is 2 to 100] and lauroxypoly(ethylene-propylene) glycol (meth)acrylate [the total number (m) of the number of the ethylene glycol units and the number of the propylene glycol units is 2 to 100].

The examples of the multifunctional monomer into which a trimethylsilyl group or a tris(trimethylsiloxy)silyl group can be introduced include, for example, (meth)acrylic acid, 2-hydroxyethyl (meth)acrylate, glycidyl (meth)acrylate, 2-isocyanatoethyl (meth)acrylate, those in which $R_8$ is a hydrogen atom in the formula (F), allyl glycidyl ether, 2-hydroxyethyl vinyl ether and 4-hydroxybutyl vinyl ether.

The monomer (H) includes, for example, (meth)acrylates other than (C), (D) and (F) described above such as tridecyl (meth)acrylate, myristyl (meth)acrylate, hexadecyl (meth) acrylate, stearyl (meth)acrylate, behenyl (meth)acrylate, cyclohexyl (meth)acrylate, isobonyl (meth)acrylate and nonylphenoxypolyethylene glycol (meth)acrylate; aromatic hydrocarbon base vinyl compounds such as styrene, α-methylstyrene, chlorostyrene and vinyltoluene; vinyl esters or allyl compounds such as vinyl acetate, vinyl propionate and diallyl phthalate; vinyl ethers such as ethyl vinyl ether, normal propyl vinyl ether, isopropyl vinyl ether, normal butyl vinyl ether, isobutyl vinyl ether, tertiary butyl vinyl ether, normal octyl vinyl ether, 2-ethylhexyl vinyl ether, methyl vinyl ether and cyclohexyl vinyl ether; vinyl chloride; vinylidene chloride; chloroprene; propylene; butadiene; isoprene; and fluoroolefinmaleimide.

A method for synthesizing the copolymer of the present invention includes an emulsion polymerization method, a suspension polymerization method, a solution polymerization method and a bulk polymerization method. Conventional azo base polymerization initiators and peroxides used as an initiator for carrying out the polymerization.

Capable of being used as a method for introducing a trimethylsilyl group into the copolymer is a method in which polymerization reaction is carried out and then reactive silane having a trimethylsilyl group is added or condensed.

The present invention relates to the functions of the copolymer and therefore shall by no means be restricted by the synthetic process of the copolymer.

Addition of the flow-and-leveling agent for a water base coating according to the present invention to coatings to which high appearance is required, for example, waterborne basecoatings for automobiles, waterborne primer coatings for automobiles, waterborne monocoat for automobiles and waterborne coatings for high grade furnitures makes it possible to provide the coated surface with a sufficiently high flow-and-leveling property in applying these coatings and prevent cissing and craters from being produced.

Timing for adding the flow-and-leveling agent for a water base coating according to the present invention is optional, and it can be added in the course of grinding a pigment or after producing the coating.

An addition amount of the flow-and-leveling agent for a water base coating according to the present invention is varied depending on the kind of the resins for the coating and the blend compositions of the pigments and is usually 0.01 to 5% by weight, preferably 0.05 to 2% by weight based on the coating vehicles in terms of the solid matters. If the addition amount is smaller than 0.01% by weight, the coated surface can not be provided with a sufficiently high flow-and-leveling property. On the other hand, if it is more than 5% by weight, various adverse effects are more likely to be exerted in recoating.

EFFECTS OF THE INVENTION

The flow-and-leveling agent for a water base coating according to the present invention is a novel acryl silicone base copolymer and makes it possible to provide such a good flow-and-leveling property as has so far never been obtained.

EXAMPLES

Next, the present invention shall be explained in further details with reference to examples, but the present invention shall not be restricted to these examples.

"Parts" and "%" in the following mean "parts by weight" and "% by weight" respectively.

Production Example 1

A reactor of 1000 ml equipped with a stirrer, a reflux condenser, a dropping funnel, a thermometer and a nitrogen gas-introducing port was charged with 150 parts of propylene glycol monopropyl ether (hereinafter abbreviated as PFG) and heated to 120° C. while introducing nitrogen gas. Then, the following solution (a-1) was dropwise added at a constant rate through the dropping funnel in 2 hours.

| Solution (a-1) | |
|---|---|
| Tertiary butyl acrylate [(meth)acrylic acid ester (C)] | 75 parts |
| Methoxypolyethylene glycol methacrylate (the number (m) of the ethylene glycol units is 23) [(meth)acrylic acid ester (F)] | 75 parts |
| 3-Methacryloxypropyltris(trimethylsiloxy)-silane [monomer (B)] | 50 parts |
| PFG | 150 parts |
| t-Butyl peroxy-2-ethylhexanoate | 7.5 parts |

After one hour since finishing dropwise adding the solution (a-1), 2 parts of t-butyl peroxy-2-ethylhexanoate was added, and the reaction was further continued for 2 hours while keeping a temperature of 120° C. After finishing the reaction, the reaction solution was adjusted to a concentration of 30% by PFG to obtain an additive [A-1]. The synthesized acryl silicone base copolymer had a number average molecular weight of 5000 in terms of polystyrene, which was determined by gel permeation chromatography.

Production Example 2

An additive [A-2] was obtained in the same manner as in Production Example 1, except that the following solution (a-2) was substituted for the solution (a-1) used in Production Example 1.

| Solution (a-2) | |
|---|---|
| Isobutyl acrylate [(meth)acrylic acid ester (C)] | 75 parts |
| N-Tertiary butylacrylamide [acrylamide (E)] | 75 parts |
| 3-Methacryloxypropyltris(trimethylsiloxy)-silane [monomer (B)] | 50 parts |
| PFG | 150 parts |
| t-Butyl peroxy-2-ethylhexanoate | 10 parts |

The synthesized acryl silicone base copolymer had a number average molecular weight of 1500 in terms of polystyrene, which was determined by gel permeation chromatography.

Production Example 3

An additive [A-3] was obtained in the same manner as in Production Example 1, except that the following solution (a-3) was substituted for the solution (a-1) used in Production Example 1.

| Solution (a-3) | |
|---|---|
| 2-Methoxyethyl acrylate [(meth)acrylic acid ester (D)] | 40 parts |
| N,N-Dimethylacrylamide [acrylamide (E)] | 30 parts |
| Isononyl acrylate [(meth)acrylic acid ester (C)] | 40 parts |
| Tertiary butyl vinyl ether [monomer (H)] | 40 parts |
| 3-Methacryloxypropyltris (trimethylsiloxy)-silane [monomer (B)] | 50 parts |
| PFG | 150 parts |
| t-Butyl peroxy-2-ethylhexanoate | 10 parts |

The synthesized vinyl silicone base copolymer had a number average molecular weight of 2500 in terms of polystyrene, which was determined by gel permeation chromatography.

Production Example 4

An additive [A-4] was obtained in the same manner as in Production Example 1, except that the following solution (a-4) was substituted for the solution (a-1) used in Production Example 1.

| Solution (a-4) | |
| --- | --- |
| N,N-Dimethylacrylamide [acrylamide (E)] | 100 parts |
| 2-Butoxyethyl acrylate [(meth)acrylic acid ester (D)] | 100 parts |
| 3-Methacryloxypropyltris(trimethylsiloxy)- silane [monomer (B)] | 100 parts |
| PFG | 150 parts |
| t-Butyl peroxy-2-ethylhexanoate | 15 parts |

The synthesized acryl silicone base copolymer had a number average molecular weight of 2000 in terms of polystyrene, which was determined by gel permeation chromatography.

Production Example 5

An additive [A-5] was obtained in the same manner as in Production Example 1, except that the following solution (a-5) was substituted for the solution (a-1) used in Production Example 1.

| Solution (a-5) | |
| --- | --- |
| Lauroxypolyethylene glycol acrylate (the number (m) of the ethylene glycol units is 10) [(meth)acrylic acid ester (F)] | 80 parts |
| Tertiary butyl acrylate [(meth)acrylic acid ester (C)] | 80 parts |
| Acrylic acid [(meth)acrylic acid (G)] | 80 parts |
| 3-Methacryloxypropyltrimethylsilane [monomer (A)] | 80 parts |
| PFG | 150 parts |
| t-Butyl peroxy-2-ethylhexanoate | 3.2 parts |

The synthesized acryl silicone base copolymer had a number average molecular weight of 10000 in terms of polystyrene, which was determined by gel permeation chromatography.

Production Example 6

An additive [A-6] was obtained in the same manner as in Production Example 1, except that the following solution (a-6) was substituted for the solution (a-1) used in Production Example 1.

| Solution (a-6) | |
| --- | --- |
| Ethyl acrylate [(meth)acrylic acid ester (C)] | 140 parts |
| N,N-Dimethylacrylamide [acrylamide (E)] | 145 parts |
| 3-Methacryloxypropyltris(trimethylsiloxy)- silane [monomer (B)] | 15 parts |
| PFG | 150 parts |
| t-Butyl peroxy-2-ethylhexanoate | 15 parts |

The synthesized acryl silicone base copolymer had a number average molecular weight of 3000 in terms of polystyrene, which was determined by gel permeation chromatography.

Production Example 7

An additive [A-7] was obtained in the same manner as in Production Example 1, except that the following solution (a-7) was substituted for the solution (a-1) used in Production Example 1.

| Solution (a-7) | |
| --- | --- |
| 2-Ethoxyethyl acrylate [(meth)acrylic acid ester (D)] | 25 parts |
| N,N-Dimethylacrylamide [acrylamide (E)] | 25 parts |
| 3-Methacryloxypropyltris(trimethylsiloxy)- silan | 250 parts |
| PFG | 100 parts |
| t-Butyl peroxy-2-ethylhexanoate | 6 parts |

The synthesized acryl silicone base copolymer had a number average molecular weight of 8000 in terms of polystyrene, which was determined by gel permeation chromatography.

Production Example 8

The reaction was carried out in the same manner as in Production Example 1, and then the following (a-8b) was added thereto to obtain an additive [A-8], except that the following solution (a-8a) was substituted for the solution (a-1) used in Production Example 1.

| Solution (a-8a) | |
| --- | --- |
| Tertiary butyl acrylate [(meth)acrylic acid ester (C)] | 75 parts |
| N,N-Dimethylacrylamide [acrylamide (E)] | 75 parts |
| 2-Isocyanatoethyl methacrylate [multifunctional monomer] | 50 parts |
| PFG | 100 parts |
| t-Butyl peroxy-2-ethylhexanoate | 15 parts |
| (a-8b) | |
| 3-Aminopropyltris(trimethylsiloxy)silane [tris(trimethy siloxy)silylgroup-containing compound] | 150 parts |

After one hour since finishing dropwise adding the solution (a-8a), 3 parts of t-butyl peroxy-2-ethylhexanoate was added, and the reaction was further continued for 2 hours while keeping a temperature of 120° C. After finishing the reaction, the solution was cooled down to a room temperature, and (a-8b) was dropwise added thereto in one hour. After left standing for 24 hours, the non-volatile matter content was adjusted to 30% by PFG to obtain an additive [A-8].

The synthesized acryl silicone base copolymer had a number average molecular weight of 3000 in terms of polystyrene, which was determined by gel permeation chromatography.

Production Example 9

The reaction was carried out in the same manner as in Production Example 1, and then the following (a-9b) was added thereto to obtain an additive [A-9], except that the following solution (a-9a) was substituted for the solution (a-1) used in Production Example 1.

| Solution (a-9a) | |
|---|---|
| 2-Methoxyethyl acrylate [(meth)acrylic acid ester (D)] | 100 parts |
| Tertiary butyl vinyl ether [monomer (H)] | 100 parts |
| Tertiary butylacrylamide [acrylamide (E)] | 50 parts |
| 2-Isocyanatoethyl methacrylate [multifunctional monomer] | 50 parts |
| Toluene | 50 parts |
| t-Butyl peroxy-2-ethylhexanoate | 15 parts |

| (a-9b) | |
|---|---|
| 3-Aminopropyltris(trimethylsiloxy)silane [tris(trimethy siloxy)silylgroup-containing compound] | 150 parts |

After one hour since finishing dropwise adding the solution (a-9a), 3 parts of t-butyl peroxy-2-ethylhexanoate was added, and the reaction was further continued for 2 hours while keeping a temperature of 120° C. After finishing the reaction, the solution was cooled down to a room temperature, and (a-9b) was dropwise added in one hour. After left standing for 24 hours, the non-volatile matter content was adjusted to 30% by PFG to obtain an additive [A-9].

The synthesized vinyl silicone base copolymer had a number average molecular weight of 2500 in terms of polystyrene, which was determined by gel permeation chromatography.

Comparative Production Example 1

An additive [N-1] was obtained in the same manner as in Production Example 1, except that the following solution (n-1) was substituted for the solution (a-1) used in Production Example 1.

| Solution (n-1) | |
|---|---|
| Ethyl acrylate [(meth)acrylic acid ester (C)] | 200 parts |
| 3-Methacryloxypropyltris(trimethylsiloxy)silane [monomer (B)] | 100 parts |
| PFG | 150 parts |
| t-Butyl peroxy-2-ethylhexanoate | 7.5 parts |

The synthesized acryl silicone base copolymer had a number average molecular weight of 6000 in terms of polystyrene, which was determined by gel permeation chromatography.

Comparative Production Example 2

An additive [N-2] was obtained in the same manner as in Production Example 1, except that the following solution (n-2) was substituted for the solution (a-1) used in Production Example 1.

| Solution (n-2) | |
|---|---|
| Methoxypolyethylene glycol methacrylate (the number (m) of the ethylene glycol units is 23) [(meth)acrylic acid ester (F)] | 200 parts |

| Solution (n-2) | |
|---|---|
| 3-Methacryloxypropyltris(trimethylsiloxy)silane [monomer (B)] | 100 parts |
| PFG | 150 parts |
| t-Butyl peroxy-2-ethylhexanoate | 10 parts |

The synthesized acryl silicone base copolymer had a number average molecular weight of 4000 in terms of polystyrene, which was determined by gel permeation chromatography.

Comparative Production Example 3

An additive [N-3] was obtained in the same manner as in Production Example 1, except that the following solution (n-3) was substituted for the solution (a-1) used in Production Example 1.

| Solution (n-3) | |
|---|---|
| Ethyl acrylate [(meth)acrylic acid ester (C)] | 150 parts |
| Methoxypolyethylene glycol methacrylate (the number (m) of the ethylene glycol units is 23) [(meth)acrylic acid ester (F)] | 145 parts |
| 3-Methacryloxypropyltris(trimethylsiloxy)silane [monomer (B)] | 5 parts |
| PFG | 150 parts |
| t-Butyl peroxy-2-ethylhexanoate | 6 parts |

The synthesized acryl silicone base copolymer had a number average molecular weight of 7500 in terms of polystyrene, which was determined by gel permeation chromatography.

Comparative Production Example 4

An additive [N-4] was obtained in the same manner as in Production Example 1, except that the following solution (n-4) was substituted for the solution (a-1) used in Production Example 1.

| Solution (n-4) | |
|---|---|
| Ethyl acrylate [(meth)acrylic acid ester (C)] | 6.5 parts |
| Acrylic acid [(meth)acrylic acid (G)] | 15.5 parts |
| 3-Methacryloxypropyltris(trimethylsiloxy)silane [monomer (B)] | 278 parts |
| PFG | 150 parts |
| t-Butyl peroxy-2-ethylhexanoate | 7.5 parts |

The synthesized acryl silicone base copolymer had a number average molecular weight of 5000 in terms of polystyrene, which was determined by gel permeation chromatography.

Comparative Production Example 5

An additive [N-5] was obtained in the same manner as in Production Example 1, except that the following solution (n-5) was substituted for the solution (a-1) used in Production Example 1.

| Solution (n-5) | |
|---|---|
| Tertiary butyl acrylate [(meth)acrylic acid ester (C)] | 150 parts |
| Methoxypolyethylene glycol methacrylate (the number (m) of the ethylene glycol units is 23) [(meth)acrylic acid ester (F)] | 150 parts |
| 3-Methacryloxypropyltris(trimethylsioxy)-silane [monomer (B)] | 100 parts |
| PFG | 50 parts |
| t-Butyl peroxy-2-ethylhexanoate | 0.5 part |

The synthesized acryl silicone base copolymer had a number average molecular weight of 45,000 in terms of polystyrene, which was determined by gel permeation chromatography.

Comparative Production Example 6

An additive [N-6] was obtained in the same manner as in Production Example 1, except that the following solution (n-6) was substituted for the solution (a-1) used in Production Example 1.

| Solution (n-6) | |
|---|---|
| Tertiary butyl acrylate [(meth)acrylic acid ester (C)] | 50 parts |
| N-Tertiary butylacrylamide [acrylamide (E)] | 50 parts |
| 3-Methacryloxypropyltris(trimethylsiloxy)-silane [monomer (B)] | 50 parts |
| PFG | 350 parts |
| t-Butyl peroxy-2-ethylhexanoate | 15 parts |

The synthesized acryl silicone base copolymer had a number average molecular weight of 400 in terms of polystyrene, which was determined by gel permeation chromatography.

Comparative Production Example 7

AQ-200 (manufactured by Kusumoto Chemicals, Ltd.) was used as a commercially available flow-and-leveling agent of an acryl copolymer base. This was designated as an additive [N-7].

Comparative Production Example 8

Byk-348 (manufactured by Byk Chemie Co., Ltd.) was used as a commercially available flow-and-leveling agent of a silicone base. This was designated as an additive [N-8].

TABLE 1

Polymers used in production examples

| Sample name | Number average molecular weight | Active Ingredient (%) | |
|---|---|---|---|
| Production Example 1 | A-1 | 5000 | 30 |
| Production Example 2 | A-2 | 1500 | 30 |
| Production Example 3 | A-3 | 2500 | 30 |

TABLE 1-continued

Polymers used in production examples

| | Sample name | Number average molecular weight | Active Ingredient (%) |
|---|---|---|---|
| Production Example 4 | A-4 | 2000 | 30 |
| Production Example 5 | A-5 | 10000 | 30 |
| Production Example 6 | A-6 | 3000 | 30 |
| Production Example 7 | A-7 | 8000 | 30 |
| Production Example 8 | A-8 | 3000 | 30 |
| Production Example 9 | A-9 | 2500 | 30 |

TABLE 2

Polymers used in comparative production examples

| | Sample name | Number average molecular weight | Active Ingredient (%) |
|---|---|---|---|
| Comparative Production Example 1 | N-1 | 6000 | 30 |
| Comparative Production Example 2 | N-2 | 4000 | 30 |
| Comparative Production Example 3 | N-3 | 7500 | 30 |
| Comparative Production Example 4 | N-4 | 5000 | 30 |
| Comparative Production Example 5 | N-5 | 45000 | 30 |
| Comparative Production Example 6 | N-6 | 400 | 30 |
| Comparative Production Example 7 | N-7 | — | 20 |
| Comparative Production Example 8 | N-8 | — | 100 |

Coating Test Example 1

(Flow-and-Leveling Property Test With Waterborne Base Coating)

Waterborne base coating composition having proportions shown in Table 3 was tested for a flow-and-leveling property.

[Preparation of Metallic Base Coating]

A composition A, a composition B and a composition C each shown in Table 3 were homogeneously mixed in this order while stirring by means of a disper to prepare an acryl melamine base aqueous metallic base coating. The resulting coating was controlled to a pH of 7.8 by dimethylethanolamine and then diluted with distilled water so that the viscosity was 30 seconds (20° C.) in terms of Ford cup #4. An additive shown in table 1 or Table 2 was added to the waterborne base coating thus prepared so that the ingredient content was 0.3% based on the coating, and the mixture was homogeneously stirred by means of the disper.

[Preparation of Soleventborne Primercoat Plate]

The viscosity of an soleventborne primer coating having a composition shown in Table 5 was controlled with a diluent solvent so that the viscosity was 18 seconds in terms of Ford cup #4, and then the coating was applied on a tin plate (0.3 mm×200 mm×300 mm) by means of an air spray and baked in an oven at 140° C. for 20 minutes. Three soleventborne primercoat plates were prepared for each test sample. After cooled down to a room temperature, a waterdrop was fallen on one soleventborne primercoat plate and dried at 80° C. After the waterdrop was dried, the additive stayed in the state that it was put together and concentrated. Further, a machine oil was adhered as a contaminant on another soleventborne primercoat plate. The remaining one soleventborne primercoat plate was used as it was for coating the waterborne base coating.

[Test of Flow-and-Leveling Property]

The metallic base coating prepared above was left standing for 24 hours and then coated on the soleventborne primercoat plate by means of an air spray so that the film thickness after being dried was 15 μ. After drying the film in an oven of 80° C. for 10 minutes, flow-and-leveling property of the metallic base coating surface was visually evaluated. Then a top clear coating shown in Table 4 was applied thereon by means of the air spray so that the film thickness after being dried was 40μ, and after setting for 10 minutes, it was baked in an oven of 140° C. for 20 minutes. Cooling the baked product off to room temperature, flow-and-leveling property of the top clear coating-applied surface was visually observed for evaluating the top coating property.

[Evaluation of Flow-and-Leveling Property]

The flow-and-leveling property of the waterborne coating itself and the surface state after applying the top clear coating were visually observed respectively to evaluate them according to the five grades of "best" (5) to "worst" (1). (The differences in the top coating proper grades among those top coating-applied surfaces were significantly relevant to the kind of flow-and-leveling agents added to the metallic base coating.) Further, the numbers of ruptures and craters observed on the coating film which was coated on the contaminant were visually counted to evaluate them according to the five grades of "best" (5) to "worst" (1). The results thereof are shown in Table 6.

Coating Test Example 2

(Evaluation with Waterborne Primer Coating)

[Test of Flow-and-Leveling Property]

The additives shown in Table 1 or Table 2 were added to a waterborne primer coating having a composition shown in Table 7, and the mixture was homogeneously stirred by means of a disper. Three cationically electrodeposited plates (0.8 mm×200 mm×300 mm) were prepared for each test sample. A fingerprint was put on the first cationically electrodeposited plate with a finger on which hand cream was applied. A machine oil was adhered as a contaminant on another cationically electrodeposited plate. A waterborne primer coating for investigation was applied on the remaining one cationically electrodeposited plate as it was. After 24 hours since adding the additive for test, a waterborne primer coating was diluted with distilled water so that the viscosity was 25 seconds in terms of Ford cup #4. This waterborne primer coating was applied on the cationically electrodeposited plate for test by means of the air spray so that the film thickness after dried was 30μ. After setting for 10 minutes, it was dried in an oven of 80° C. for 10 minutes and further baked in an oven of 160° C. for 25 minutes.

The recoatability was tested in the following manner. The flow-and-leveling property of the waterborne primer coating applied on the cationically electrodeposited plate was evaluated, and then a solventborne primer coating shown in Table 5 was applied thereon by means of the air spray so that the film thickness after dried was 30 μ. After setting for 5 minutes, it was baked in an oven of 140° C. for 20 minutes. Cooling the baked product off to room temperature, flow-and-leveling property of the top clear coating-applied surface was visually observed for evaluating the solventborne primer coating property.

[Evaluation of Flow-and-Leveling Property]

The surface state was visually observed to evaluate the flow-and-leveling property according to the five grades of "best" (5) to "worst" (1). (The differences in the top coating proper grades among those top coating-applied surfaces were significantly relevant to the kind of flow-and-leveling agents added to the waterborne primer coating.) Further, the numbers of ruptures and craters observed on the coating film which was coated on the contaminant were visually counted to evaluate them according to the five grades of "best" (5) to "worst" (1). The results thereof are shown in Table 8.

[Evaluation of Layer-to-Layer Adhesive Property]

The solventborne primer coating was applied on a plate coated with the waterborne primer coating, and it was used for testing a layer-to-layer adhesive property. Hundred cross cut blocks having an equal width of 1 mm were produced in a square of 10 mm×10 mm on the coated plate by means of a cutter to carry out a peeling test with a cellophane adhesive tape, and the number of the remaining blocks of the above primer coating film was counted. The results thereof are shown in Table 8.

TABLE 3

Composition of aqueous metallic base coating

| Raw material name | Amount (parts) | Manufacturer of raw material |
| --- | --- | --- |
| Composition A | | |
| Setalux 6801 AQ-24 | 480 | AKZO NOBEL |
| Setamine MS-155 AQ-80 | 47 | AKZO NOBEL |
| 2-Butoxyethanol | 41 | Kyoei solvent Co., Ltd. |
| Distilled water | 255 | |
| Dimethylethanolamine 10% aqueous solution | 10 | |
| Composition B | | |
| Aluminum paste: AW-7000R# | 37.5 | Asahi Chemical Ind. Co., Ltd. |
| 2-Butoxyethanol | 33.0 | Kyoei solvent Co., Ltd. |
| Setal 6306 SS-66 | 31.5 | AKZO NOBEL |
| Dimethylethanolamine | 1.0 | Kanto Chemical Ind. Co., Ltd. |
| Composition C | | |
| Setal 6407 SQ-26 | 64 | AKZO NOBEL |

TABLE 4

Composition of top coat clear coating

| Raw material name | Amount (parts) | Manufacturer of raw material |
| --- | --- | --- |
| Jhoncryl 500 | 203.6 | Jhonson Polymer Co., Ltd. |
| Cymel 325 | 69.7 | Mitsui Cytec Co., Ltd. |
| Nacure 5528 | 0.88 | King Industries |

TABLE 4-continued

Composition of top coat clear coating

| Raw material name | Amount (parts) | Manufacturer of raw material |
|---|---|---|
| Flow-and-leveling agent: Disparlon LHP-90 | 0.7 | Kusumoto Chemicals, Ltd. |
| Defoaming agent: Disparlon AP-10 | 1.75 | Kusumoto Chemicals, Ltd. |
| Diluent solvent*) | 97.7 | |

*)Diluent solvent:
Solvesso #100/methyl isobutyl ketone/butyl alcohol = 30/30/40

TABLE 5

Composition of solvent base intermediate coating

| Raw material name | Amount (parts) | Manufacturer of raw material |
|---|---|---|
| Becksol EY-3002-65 | 15.0 | Dainippon Ink & Chemicals, Inc. |
| Becksol 57-1362 | 30.0 | Dainippon Ink & Chemicals, Inc. |
| Titanium dioxide CR-93 | 34.3 | Ishihara Sangyo Kaisha., Ltd. |
| Carbon black MA-100 | 0.7 | Mitsubishi Chemical Corp. |
| Super Becamine G-821-60 | 20.0 | Dainippon Ink & Chemicals, Inc. |
| Diluent solvent*) | 65.0 | |
| Disparlon L-1984-50 (leveling agent) | 0.45 | Kusumoto Chemicals, Ltd. |
| Disparlon AP-10 (defoaming agent) | 0.45 | Kusumoto Chemicals, Ltd. |

*)Diluent solvent:
Solvesso #100/xylene/butyl cellosolve/butyl alcohol = 40/30/20/10

TABLE 6

Test results of flow-and-leveling agents for waterborne base coating

| Sample name | Addition amount(%) | Flow-and-leveling property of waterborne base coating | Coating property of top coat clear coating | Rupture caused by contaminant Waterdrop mark | Rupture caused by contaminant Machine oil |
|---|---|---|---|---|---|
| A-1 | 1.0 | 5 | 5 | 5 | 5 |
| A-2 | 1.0 | 5 | 5 | 5 | 5 |
| A-3 | 1.0 | 5 | 5 | 5 | 5 |
| A-4 | 1.0 | 4 | 5 | 3 | 3 |
| A-5 | 1.0 | 5 | 5 | 5 | 5 |
| A-6 | 1.0 | 3 | 5 | 3 | 3 |
| A-7 | 1.0 | 4 | 3 | 5 | 5 |
| A-8 | 1.0 | 5 | 5 | 5 | 5 |
| A-9 | 1.0 | 4 | 5 | 4 | 5 |
| N-1 | 1.0 | — | — | — | — |
| N-2 | 1.0 | 2 | 5 | 1 | 1 |
| N-3 | 1.0 | 1 | 5 | 1 | 1 |
| N-4 | 1.0 | 2 | 1 | 3 | 5 |
| N-5 | 1.0 | — | — | — | — |
| N-6 | 1.0 | 1 | 5 | 1 | 1 |
| N-7 | 1.5 | 4 | 5 | 4 | 1 |
| N-8 | 0.3 | 5 | 3 | 3 | 1 |

*) The evaluation results marked by — showed that the additive could not homogeneously be dispersed and that the coating film capable of being evaluated could not be formed.

TABLE 7

Composition of water base intermediate coating

| Raw material name | Amount (parts) | Manufacturer of raw material |
|---|---|---|
| Setal X11366 | 520.0 | AKZO NOBEL |
| Barium sulfate: W-1 | 160.9 | Takehara chemical Co., Ltd. |
| Titanium dioxide: JR-600A | 160.9 | Tayca Corporation |
| Carbon black: MA-100 | 1.2 | Mitsubishi Chemical Corp. |
| Setamine MS-155AQ-80 | 73.1 | AKZO NOBEL |
| Butyl carbitol | 23.4 | Kyoei Solvent Co., Ltd. |
| Distilled water | 25.0 | |

TABLE 8

Test results of flow-and-leveling agents for waterborne primer coating

| Sample name | Addition amount (%) | Flow-and-leveling property of waterborne primer coating | Coating property of solventborne primer coating | Layer-to-layer adhesive property | Rupture caused by contaminant Hand cream | Rupture caused by contaminant Machine oil |
|---|---|---|---|---|---|---|
| A-1 | 1.0 | 5 | 5 | 100/100 | 5 | 5 |
| A-2 | 1.0 | 5 | 5 | 100/100 | 5 | 5 |
| A-3 | 1.0 | 5 | 5 | 100/100 | 5 | 5 |
| A-4 | 1.0 | 4 | 5 | 100/100 | 3 | 3 |
| A-5 | 1.0 | 5 | 5 | 100/100 | 5 | 5 |
| A-6 | 1.0 | 3 | 5 | 90/100 | 3 | 2 |
| A-7 | 1.0 | 4 | 3 | 100/100 | 5 | 5 |
| A-8 | 1.0 | 5 | 5 | 100/100 | 5 | 5 |
| A-9 | 1.0 | 4 | 5 | 100/100 | 5 | 4 |
| N-1 | 1.0 | — | — | — | — | — |
| N-2 | 1.0 | 2 | 5 | 100/100 | 2 | 2 |
| N-3 | 1.0 | 1 | 5 | 50/100 | 1 | 1 |
| N-4 | 1.0 | 3 | 1 | 100/100 | 5 | 5 |
| N-5 | 1.0 | — | — | — | — | — |
| N-6 | 1.0 | 1 | 5 | 25/100 | 1 | 1 |

TABLE 8-continued

Test results of flow-and-leveling agents for waterborne primer coating

| Sample name | Addition amount (%) | Flow-and-leveling property of waterborne primer coating | Coating property of solventborne primer coating | Layer-to-layer adhesive property | Rupture caused by contaminant | |
|---|---|---|---|---|---|---|
| | | | | | Hand cream | Machine oil |
| N-7 | 1.5 | 4 | 2 | 50/100 | 1 | 1 |
| N-8 | 0.3 | 5 | 3 | 50/100 | 3 | 1 |

*) The evaluation results marked by — showed that the additive could not homogeneously be dispersed and that the coating film capable of being evaluated could not be formed.

The invention claimed is:

1. A method for imparting flow-and-leveling properties to a water base coating comprising the step of: adding a trimethylsilyl group-containing copolymer obtained by copolymerizing 3-methacryloxypropyltrimethysilane (A) and/or a reactive monomer (B) selected from the group consisting of 3-methacryloxypropyltris(trimethylsiloxy)silane and vinyltris(trimethylsiloxy)silane with a (meth) acrylic acid ester (C) represented by the formula:

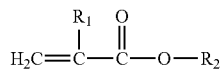

wherein $R_1$ represents a hydrogen atom or methyl, and $R_2$ represents an alkyl group having 1 to 12 carbon atoms, and/or a (meth)acrylic acid ester (D) represented by the formula:

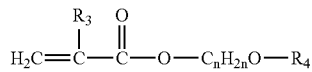

wherein $R_3$ represents a hydrogen atom or methyl; $R_4$ represents an alkyl group having 1 to 18 carbon atoms; and n represents an integer of 2, 3 or 4, and acrylamide (E) represented by the formula:

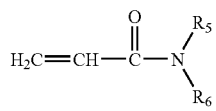

wherein $R_5$ and $R_6$ each represent a hydrogen atom or an alkyl group having 1 to 8 carbon atoms, and/or a (meth) acrylic acid ester (F) represented by the formula:

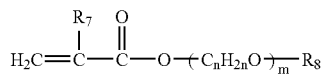

wherein $R_7$ represents a hydrogen atom or methyl; $R_8$ represents a hydrogen atom or an alkyl group having 1 to 18 carbon atoms; m represents an integer of 2 to 100, and n represents an integer of 2, 3 or 4; and —$(C_nH_{2n}O)_m$— means that 2 to 100 units of only one kind of a glycol unit out of three kinds of the glycol units in which n is 2, 3 and 4 are present and that total 2 to 100 units of two or three kinds of the glycol units out of the three kinds of the above glycol units are present, and/or a (meth)acrylic acid (G) represented by the formula:

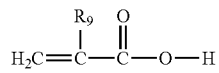

wherein $R_9$ represents a hydrogen atom or methyl, wherein the above trimethylsilyl group-containing copolymer contains a trimethylsilyl group originating in the monomer (A) and/or the monomer (B) in a proportion of 2 to 64% by weight, a copolymerization unit originating in the (meth) acrylic acid ester (C) and/or the (meth)acrylic acid ester (D) in a proportion of 2% by weight or more, a copolymerization unit originating in the acrylamide (E) and/or the (meth) acrylic acid ester (F) and/or the (meth)acrylic acid (G) in a proportion of 5% by weight or more, and it has a number average molecular weight of 500 to 30000, to the water base coating.

2. A method for imparting flow-and-leveling properties to a water base coating comprising the step of: adding a trimethylsilyl group-containing copolymer obtained by copolymerizing the monomer (A) and/or the monomer (B) described in claim 1, the (meth)acrylic acid ester (C) and/or the (meth)acrylic acid ester (D) described in claim 1 and the acrylamide (E) and/or the (meth)acrylic acid ester (F) and/or the (meth)acrylic acid (G) described in claim 1 with a reactive monomer (H) capable of being copolymerized with them, wherein the above copolymer contains a trimethylsilyl group originating in the monomer (A) and/or the monomer (B) in a proportion of 2 to 64% by weight, a copolymerization unit originating in the (meth)acrylic acid ester (C) and/or the (meth) acrylic acid ester (D) in a proportion of 2% by weight or more, a copolymerization unit originating in the acrylamide (E) and/or the (meth)acrylic acid ester (F) and/or the (meth)acrylic acid (G) in a proportion of 5% by weight or more, a copolymerization unit originating in the monomer (H) in a proportion of not exceeding 50% by weight, and it has a number average molecular weightof 500 to 30000, to the water base coating.

3. The method as described in claims 1 or 2, wherein the (meth)acrylic acid ester (C) is selected from the group consisting of methyl(meth)acrylate, ethyl(meth)acrylate, normal propyl(meth)acrylate, isopropyl (meth)acrylate, normal butyl(meth)acrylate, isobutyl (meth)acrylate, tertiary butyl(meth)acrylate, normal octyl(meth)acrylate, 2-ethylhexyl(meth)acrylate, isononyl(meth)acrylate and lauryl (meth)acrylate.

4. The method as described in claims 1 or 2, wherein the (meth)acrylic acid ester (D) is selected from the group consisting of 2-methoxyethyl (meth)acrylate, 2-ethoxyethyl (meth)acrylate, 2-butoxyethyl(meth)acrylate, 2-octoxyethyl (meth)acrylate, 2-lauroxyethyl(meth)acrylate, 2-stearoxyethyl(meth)acrylate, 3-methoxybutyl(meth)acrylate and 4-methoxybutyl(meth)acrylate.

5. The method as described in claims 1 or 2, wherein the acrylamide (E) is selected from the group consisting of acrylamide, N-methylacrylamide, N-ethylacrylamide, N-isopropylacrylamide, N-normal butylacrylamide, N-tertiary butylacrylamide, N2-ethylhexylacrylamide, N,N-dimethylacrylamide, N,N-diethylacrylamide and diacetoneacrylamide.

6. The method as described in claims 1 or 2, wherein the (meth)acrylic acid ester (F) is selected from the group consisting of ethylcarbitol (meth)acrylate, methoxypolyethylene glycol(meth)acrylate, methoxypolypropylene glycol (meth)acrylate, methoxypoly(ethylene-propylene) glycol (meth)acrylate, methoxypoly(ethylene-tetramethylene) glycol(meth)acrylate, butoxypoly(ethylene-propylene) glycol(meth)acrylate, octoxypoly(ethylene-propylene) glycol (meth)acrylate, lauroxypolyethylene glycol(meth)acrylate and lauroxypoly(ethylene-propylene) glycol(meth)acrylate.

7. The method as described in claim 2, wherein the monomer (H) is selected from the group consisting of tridecyl (meth)acrylate, myristyl(meth)acrylate, hexadecyl (meth)acrylate, stearyl(meth)acrylate, behenyl(meth)acrylate, cyclohexyl(meth)acrylate, isobonyl (meth)acrylate, nonylphenoxypolyethylene glycol(meth)acrylate; styrene, α-methylstyrene, chlorostyrene, vinlytoluene; vinyl acetate, vinyl propionate, diallyl phthalate; ethyl vinyl ether; normal propyl vinyl ether, isopropyl vinyl ether, normal butyl vinyl ether, isobutyl vinyl ether, tertiary butyl vinyl ether, normal octyl vinyl ether, 2-ethylhexyl vinyl ether, methyl vinyl ether, cyclohexyl vinyl ether; vinyl chloride; vinylidene chloride; chloroprene; propylene; butadiene; isoprene; and fluoroolefinmaleimide.

\* \* \* \* \*